James M. Whiting.
Improved Elastic Car Wheel

No. 121,032.                                    Patented Nov. 14, 1871.

Witnesses.                                      Inventor.

UNITED STATES PATENT OFFICE.

JAMES M. WHITING, OF PROVIDENCE, RHODE ISLAND.

IMPROVEMENT IN ELASTIC CAR-WHEELS.

Specification forming part of Letters Patent No. 121,032, dated November 14, 1871.

*To all whom it may concern:*

Figure 1:
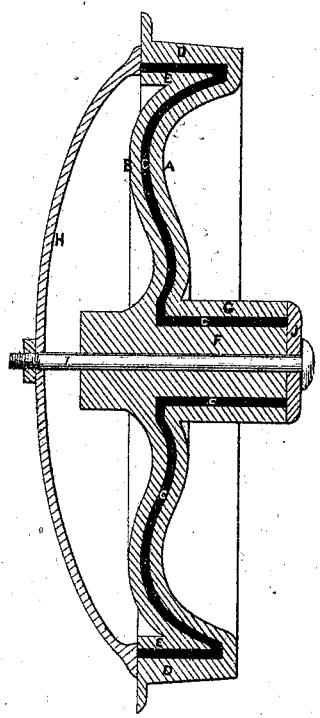
Figure 2:
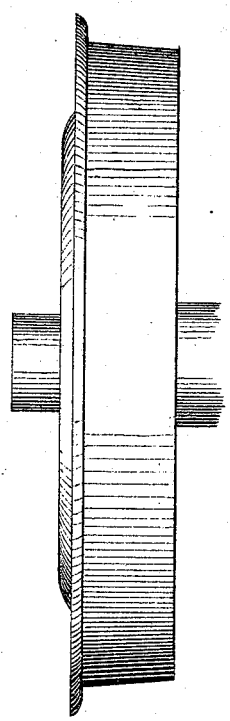

Be it known that I, JAMES M. WHITING, of Providence, in the county of Providence and State of Rhode Island, have invented certain Improvements in Elastic Car-Wheels, of which the following is a specification:

Figure 1 represents a sectional view of my invention while being completed, and Fig. 2 an edge view of the same finished.

This invention relates to that class of metallic car-wheels constructed in two parts and provided with rubber or other packing, said packing being vulcanized in place and thereby caused to hold said parts firmly together. It consists of two circular metallic plates or sections, one of which is greater in diameter than the other, its periphery constituting the tread of the wheel. Both of said sections are curved in cross-section, the line of curvature in one closely following that of the other, while the smaller section is placed within the larger, the center of the former being provided with an axle which passes through a tube or box in the latter. The two sections are so arranged as to leave a space of uniform thickness between the two, which space is filled with unvulcanized rubber or other elastic material, which is afterward vulcanized in place, as will hereinafter more fully appear.

In the drawing, A B represent circular metallic plates, which constitute the car-wheel, and are curved in cross-section, as shown in Fig. 1, the curves in one plate corresponding to and following those in the other. The plate A is provided with a flange, D, which constitutes the tread of the wheel. The plate B, which is less in diameter than plate A, is provided with a flange or periphery, E, and from its center projects the axle F, which passes through a cylindrical projection, G, on the center of plate A. The plates A B are so constructed as to leave a space between thin curved portions and annular spaces, between the tread D and flange E, and also between the axle F and cylinder G, said spaces being of uniform thickness and filled with sheets of unvulcanized rubber C of exactly the thickness of the spaces; or, rather, the rubber is attached to the plate A and the plate B subsequently inserted, as shown in Fig. 1, the rubber completely filling the spaces and preventing the plates from coming in contact with each other at any point. H represents a circular shield or guard of metal, which is convex in cross-section, and is attached to the wheel by means of the bolt I, said bolt passing through the axle F, being provided with a washer, J, which covers the exposed end of said axle, as shown, while the edge of guard H covers the annular sheet of rubber between the tread D and flange E, as shown in Fig. 1. The whole is now placed in an oven, and sufficient heat is applied to vulcanize the rubber C, which is expanded thereby, and, being closely confined on all sides, as above stated, cannot escape in any given direction, but exerts its expansive force on all parts alike, and closely adheres to the metal with which it is in contact, thereby forming a secure and effectual union between the plates A B, and holding the same as firmly together as could possibly be done by bolts. When the vulcanizing operation is completed the guard H and washer J are removed by taking out the bolt I, and the wheel is completed, as shown in Fig. 2.

I do not claim, broadly, connecting the parts of a car-wheel by vulcanizing the rubber packing in place, that having been before accomplished; but

Having thus fully described my invention, what I do claim as new, and desire to secure by Letters Patent, is—

The sections A B, the latter being provided with the axle or hub F and the former with the tread D and cylinder G, an elastic packing C being interposed between the two, substantially as described.

In testimony whereof I have signed my name to this specification in the presence of two subscribing witnesses.

JAMES M. WHITING.

Witnesses:
 SIDNEY S. WHITING,
 CHARLES F. BROWN.